United States Patent [19]

Johnson et al.

[11] Patent Number: 4,863,983
[45] Date of Patent: Sep. 5, 1989

[54] EXTRUDABLE THERMOPLASTIC HYDROCARBON POLYMER COMPOSITION

[75] Inventors: Bryce V. Johnson, Orono; Joyce M. Kunde, Lakeland, both of Minn.

[73] Assignee: Minnesota Mining and Manufacturing Company, St. Paul, Minn.

[21] Appl. No.: 182,466

[22] Filed: Apr. 15, 1988

[51] Int. Cl.$^4$ .......................... C08K 5/52; C08L 27/12; C08L 23/04; C08L 23/10

[52] U.S. Cl. .................................... 524/140; 524/145; 524/141; 525/199

[58] Field of Search ................. 525/199; 524/145, 140

[56] References Cited

U.S. PATENT DOCUMENTS

| | | | |
|---|---|---|---|
| 2,968,649 | 1/1961 | Pailthorp et al. | 160/80.5 |
| 3,051,677 | 8/1962 | Rexford | 260/29.6 |
| 3,125,547 | 3/1964 | Blatz | 260/45.5 |
| 3,169,120 | 2/1965 | Capron et al. | 524/145 |
| 3,245,949 | 4/1966 | Murdock | 524/140 |
| 3,318,854 | 5/1967 | Honn et al. | 260/87.7 |
| 3,535,276 | 10/1970 | Hecker et al. | 524/140 |
| 3,671,487 | 6/1972 | Abolins | 524/140 |
| 4,581,406 | 4/1986 | Hedberg et al. | 524/520 |
| 4,737,547 | 4/1988 | White | 525/199 |

FOREIGN PATENT DOCUMENTS 0227948 7/1987 European Pat. Off. .

OTHER PUBLICATIONS

Westover, R. F., "Melt Extrusion", *Encyclopedia of Polymer Science and Technology*, 8, John Wiley & Sons, (1968) pp. 573–581.

Rudin, A., Worm, A. T., Blacklock, J. E., "Fluorocarbon Elastomer Aids Polyolefin Extrusion", *Plastics Engineering*, Mar., 1986, pp. 63–66.

De Smedt, C., Nam, S., "The Processing Benefits of Fluoroelastomer Application in LLDPE", *Plastics and Rubber Processing and Applications*, 8, No. 1, (1987), pp. 11–16.

*Primary Examiner*—Carman J. Seccuro
*Attorney, Agent, or Firm*—Donald M. Sell; Walter N. Kirn; William G. Ewert

[57] ABSTRACT

An extrudable composition comprising hydrocarbon polymer, organophosphite or organophosphate compound and fluorocarbon polymer. The organophosphite or organophosphate and the fluorocarbon polymer are present in the composition in such relative proportions and concentrations as to reduce the occurrence of melt defects during the extrusion of said thermoplastic hydrocarbon polymer.

10 Claims, No Drawings

EXTRUDABLE THERMOPLASTIC HYDROCARBON POLYMER COMPOSITION

This invention relates to thermoplastic hydrocarbon polymers, such as polyolefins having improved extrusion characteristics. In another aspect it relates to the use of fluorocarbon polymers to improve the extrusion characteristics of such thermoplastic hydrocarbon polymers. In still a further aspect it relates to the use of organophosphites of organophosphates to improve the extrusion characteristics of such thermoplastic hydrocarbon polymers. In a still further aspect it relates to a polymer processing aid composition.

Westover, R. F., "Melt Extrusion", *Encyclopedia of Polymer Science and Technology*, Vol. 8, John Wiley & Sons, (1968) pp 573-581 states that for any polymer there is a certain critical shear rate above which the surface of the extrudate becomes rough and below which the extrudate will be smooth. He further states that in order to achieve the highest possible flow rate from the extruder and to achieve the most uniform extrudate cross section the processor must control extrudate roughness or distortion. Some of the various types of extrudate roughness and distortion observed in high and low density poyethylenes are described in Rudin, A., Worm, A. T., Blacklock J. E., "Fluorocarbon Elastomer Aids Polyolefin Extrusion," *Plastic Engineering*, March 1986, pp. 63-66. Rudin et al. state that for a given set of processing conditions and die geometry, a critical shear stress exists above which polyolefins like linear low-density polyethylne (LLDPE), high-density polyethylene (HDPE), and polypropylene suffer from melt defects. At low shear rates, defects may take the form of "sharkskin", a loss of surface gloss, which in more serious manifestations, appears as ridges running more or less transverse to the extrusion direction. At higher shear rate the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state that lowering the shear stress by adjusting the processing conditions or changing the die can avoid these defects to a certain extent, but not without creating a whole new set of problems. For example, extrusion at a higher temperature can result in weaker bubble walls in tubular film extrusion, and a wider die gap can effect film orientation. The authors state that the use of fluorocarbon elastomer processing aids can permit the operation of extruders with narrower die gaps and lower melt temperatures. Others have also described the use of fluorocarbon elastomers as processing aids, see for example, De Smedt, C., Nam, S., "The Processing Benefits of Fluoroelastomer Application in LLDPE," *Plastic and Rubber Processing and Applications*, 8, No. 1, (1987), pp. 11-16; U.S. Pat. No's. 3,125,547 (Blatz), and 4,581,406 (Hedberg et al.).

Organophosphite compounds have been used as antioxidants in polyolefins. European Pat. Appl. EP 227948 A2 (Hor et al) disclose that a combination of a tris(alkylphenyl) phosphite and dialkyl thiodipropionate added to polyolefins improves melt processability.

The present invention provides an extrudable, composition comprising (A) thermoplastic hydrocarbon polymer, e.g. polyethylene, as the major or predominant component of the composition, (B) organophosphite or organophosphate or blends thereof, and (C) fluorocarbon polymer where said organophosphite of organophosphate and said fluorocarbon polymer are present in said extrudable composition in such relative proportions and at concentrations which, in combination or in concert, are sufficient to reduce melt defects, i.e. those defects sometimes appearing in extruded thermoplastic hydrocarbon polymers such as sharkskin, melt fracture and cyclic melt fracture.

Generally, the weight of said fluorocarbon polymer in said extrudable composition and the weight of said organophosphite or organophosphate present in said extrudable composition ae in a ratio of 1/1 to 1/5. Where said extrudable composition is a final extrudate, i.e. the final product for example a film, the concentration of said fluorocarbon polymer in said composition is 0.005 to 0.2 weight percent and the concentration of said organophosphite or organophosphate in said extrudable composition is 0.01 to 0.8 weight percent, where said weight percent is based on the total weight of the extrudate.

This invention also provides a polymer processing aid composition comprising fluorocarbon polymer and organophosphite or organophosphate such that the weight of said fluorocarbon polymer in said process aid composition and the weight of said organophosphite or organophosphate in said processing aid composition are in a ratio of 1/1 to 1/5. Optionally, said processing aid composition further comprises other components such as adjuvants, e.g. antioxidants, normally added to thermoplastic hydrocarbon polymers. The concentration of said fluorocarbon polymer, organophosphite or organophosphate and any other adjuvants in said processing aid composition can vary depending upon the processor's requirement, but generally, the fluorocarbon polymer and organophosphite or organophosphate will be the major or predominant component of the composition.

The present invention is effective in reducing melt defects not only by delaying the onset of melt defects in thermoplastic hydrocarbon polymers, e.g. polyolefins, to higher extrusion shear rates than could be achieved using the same level of the fluorocarbon polymer alone, but also by permitting extruder to equilibrate and produce melt-defect-free extrudate in less time than would be required for an extrudate containing the same level of fluorocarbon polymer alone at the same extrusion conditions. This permits the use of less fluorocarbon polymer, as well as higher extruder throughputs and shorter extruder start up times resulting in more economical thermoplastic hydrocarbon polymer extrusion.

The thermoplastic hydrocarbon polymers to which the fluorocarbon polymers and organophosphite or organophosphate are added comprise polymers obtained by the homopolymerizaton or copolymerization of olefins, as well as copolymers of one or more olefins and up to about 30 weight percent, but preferably 20 weight percent or less, of one or more monomers which are copolymerizable with such olfins, e.g. vinyl ester compounds such as vinyl acetate. Said olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene and butene-1. Representative monomers which are copolymerizable with said olefins are vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile, vinyl aryl monomers such as styrene, o-methoxystyrene, p-methoxystyrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers, N-vinyl carbazole monomers, and N-vinyl pyrolidine monomers. The thermoplastic hydrocarbon polymers also include the metallic salts of said olefin copolymers, or blends thereof, which contain free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt. The thermoplastic hydrocarbon polymers also include blends of thermoplastic hydrocarbon polymers with other thermoplastic hydrocarbon polymers or blends thereof containing conventional adjuvants such as antioxidants, light stabilzers, fillers, antiblocking agents and pigments.

Representative examples of thermoplastic hydrocarbon polymers useful in this invention are polyethylene, polypropylene, polybutene-1, poly(3-methylbutene), poly(4-methylpentene) and copolymers of ethylene with propylene, butene-1, hexene-1 octene-1, decene-1, 4-methyl-1-pentene and octadecen-1.

Representative blends of thermoplastic hydrocarbon polymers useful in this invention are blends of polyethylene and polypropylene, low-density polyethylene and high-density polyethylene, and polyethylene and olefin copolymers containing said copolymerizable monomers, some of which are described above, e.g., ethylene and acrylic acid copolymers; ethylene and methyl acrylate copolymers, ethylene and ethyl acrylate copolymers, ethylene and vinyl acetate copolymers, ethylene, acrylic acid, and ethyl acrylate copolymers, and ethylene, acrylic acid, and vinyl acetate copolymers.

The preferred thermoplastic hydrocarbon polymers are homopolymers of ethylene and propylene and copolymers of ethylene and 1-butene,1-hexene, 1-octene, 4-methyl-1-pentene, propylene, vinyl acetate, and methyl acrylate.

The thermoplastic hydrocarbon polymers may be used in the form of powders, pellets, granules, or any other extrudable form.

The fluorocarbon or fluorinated polymers useful in this invention are generally homopolymers and copolymers of fluorinated olefins having a fluorine atom to carbon atom ratio of at least 1:2, preferably at least 1:1. Homopolymers which can be used ar those derived, for example, from vinylidene fluoride and vinyl fluoride. Copolymers of fluorinated olefins can be those derived, for example, from vinylidene fluoride, and one or more additional olefins, which can be fluorinated, e.g. hexafluoropropylene, and non-fluorinated, e.g. propylene.

Preferred fluorocarbon polymers are copolymers of vinylidene fluoride with at least one terminally unsaturated fluoromonoolefin containing at least one fluorine atom on each double-bonded carbon atom, each carbon atom of said fluoromonoolefin being substituted only with fluorine, chlorine, bromine, hydrogen or lower fluoroalkyl (e.g. perfluoroalkyl having one to four carbon atoms) or fluoroalkoxy radical, (e.g. perfluoroalkoxy having one to four carbon atoms). Preferred comonomers with vinylidene fluoride are perfluoropropylene, tetrafluoroethylene, chlorotrifluoroethylene, and pentafluoropropylene. Particularly preferred are the fluorinated polymers produced by copolymerizing perfluoropropylene and vinylidene fluoride, as described in U.S. Pat. Nos. 3,051,677 (Rexford) and 3,318,854 (Honn et al.) and those polymers produced by copolymerizing perfluoropropylene, vinylidene fluoride and tetrafluoroethylene as described in U.S. Pat. No. 2,968,649 (Pailthorp et al). The elastomeric copolymers of perfluoropropylene and vinylidene fluoride having between about 15 and about 50 mole percent perfluoropropylene, optionally with the addition of up to 5 to 30 mole percent tetrafluoroethylene, are particularly useful.

Some of the organophosphites and organophosphates useful in this invention can be represented by the general formula

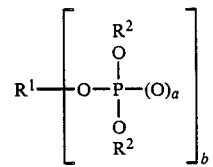

where a is 1 or 0, (where a is 0 the compound depicted is organophosphite and where a is 1 the compound depicted is organophosphate) b is an integer of 1 to 4 and equal to the valence of $R^1$, $R^1$ is a monovalent or polyvalent, (i.e. 2 to 4), organic radical, preferably the residue of a phenol, alcohol, diphenol, diol or polyol, such as ethylene glycol, 2,4-di-tert.-butylphenol, pentaerythritol, 4-nonylphenol, benzylalcohol, 4-chlorophenol, 1,1,1-trimethylolpropane and the like; the $R^2$ groups, which can be the same or different, are monovalent organic radicals having from 1 to 30 carbon atoms and can be selected from substituted and unsubstituted aryl, alkyl, or combinations thereof such as aralkyl, and cycloalkyl groups. $R^1$ and $R^2$ groups can contain heteroatoms such as O and N and can be substituted with non-interferring substituents such as chlorine, fluorine, cyano, alkyl (branched and straight chain), alkoxy, acyl, and amidocarbonyl.

Many of orgaophoshites and organophosphtes useful in his invention are known comounds and are, respectively, esters of phosphorous and phoshoric acids. Synthesis can be carried out by reaction of the desired organic hydroxy compound with phosphorus trichloride (for phosphite esters), or with phosphorus oxychloride (for phosphate esters). Many examples of both organophoshites and organophosphates are available commercially, and blends of such compounds can also be used.

Representative organophosphites and organophosphates include
tris(2,4-di-tert.-butylphenyl) phosphite,
bis(2,4-di-tert.-butylphenyl) pentaerythritol diphoshite,
tris(4-nonylphenyl) phosphite,
tris[4-(1-phenylethyl)phenyl]phosphite, tetrakis(2,4-di-tert.-butylphenyl)-4,4'-bisphenylene diphoshite,
tris(4-methylphenyl) phosphite,
tris(4-chlorophenyl) phosphite,
decyl diphenyl phosphite,
tris(2,4-di-tert.-butylphenyl) phosphate,
tris(4-methylphenyl) phosphate,
tris(4-nonylphenyl) phosphate,
tris(4-chlorophenyl) phosphate,
2-ethylhexyl diphenyl phosphate, and blends thereof.

The addition of fluorocarbon polymer and organophosphite or organophosphate to the thermoplastic hydrocarbon polymer can be accomplished by any of the means conveniently employed to add adjuvants to polymers. Thus the fluorocarbon polymer and organophosphite or organophosphate compounds can be added to the thermoplastic hydrocrbon polymer in a Banbury mixer, or a mixing extruder. Generally, the mixing operation is carried out at a temperature above the melting point of the polymer to provide uniform distribution of the fluorocarbon polymer and organophosphite or organophosphate throughout the thermoplastic hydrocarbon polymer. The processing aid composition can be prepared by blending the components using any of the means conveniently employed to add adjuvants to polymers. Thus the fluorocarbon polymer, organophosphite or organophosphate and any other adjuvants can be blended using a Banbury mixer, a mixing extruder or can be dry blended using a mixer. Generally, the mixing operation is carried out at a temperature above the melting point of the polymers to provide uniform distribution of components in said processing aid composition.

The amount of organophosphite or organophosphate and fluorocarbon polymer in said extrudable composition and said processing aid composition can vary and will depend upon such factors as the particular thermoplastic hydrocarbon polymer used, the organophosphite or organophosphate used, the fluorocarbon polymer used, and the extrusion conditions. Stated functionally, the amount of organophosphite or organophosphate and the amount of fluorocarbon polymer used in the extrudable composition will be those amounts sufficient to reduce melt defects in extruded hydrocarbon polymers. Generally, the weight of said fluorocarbon polymer present in said extrudable composition or in said processing aid composition and the weight of said organophosphite or organophosphate present in said extrudable composition or in said processing aid composition are in a ratio of 1/1 to 1,5 and preferably in a ratio of ½ to ¼. Generally said fluorocarbon polymer will be present in said extrudable composition at a concentration of 0.005 to 0.2 weight percent, and organophosphite or organophosphate will be present in the extrudable composition at a concentration of 0.01 to 0.8 weight percent based on the weight of the thermoplastic extrudable composition. Generally, the fluorocarbon polymer and organophosphite or organophosphate will be the major or predominant components of said processing aid composition, and preferably said processing aid composition will contain 10 to 90 weight percent of organophosphite or organophosphate and 10 to 50 weight percent of fluorocarbon polymer, where said weight percent is based on total processing aid composition weight.

This invention is useful in the extrusion of thermoplastic hydrocarbon polymers, which includes for example, the extrusion of films, extrusion blow molding, injection molding, pipe, wire or cable extrusion, and fiber production.

The following examples are offered to aid in a better understanding of the present invention and are not to be unnecessarily construed as limiting the scope thereof.

EXAMPLES 1–5 and COMPARATIVE EXAMPLES C1 to C9

These examples illutrate the use of organophosphites and an organophosphate in conjunction with a fluorocarbon polymer in the extrusion of polyethylene.

The polyethylene used was a commercial linear low density polyethylene (LLDPE) with a melt index of 1.0, continuing about 2 weight percent butene-1 comonomer and 0.03 weight percent of the antioxidant, octadecyl-3-(3,5-di-tert,-butyl-4-hydroxyphenyl)propionate.

The organophosphites used were tris(2,3-di-tert.-butylphenyl) phosphite (P-1), bis(2,4-di-tert.-butylphenyl) pentaerythritol diphoshite (P-2), tris(4-nonylphenyl) phosphite (P-3) and tris(4-methylphenyl) phosphite (P-4). The organophosphate used was tris(4-methylphenyl) phosphate (PA-1).

The fluorocarbon polymer used was DYNAMAR ™ Brand Polymer Processing Additive, FX-9613, a copolymer of vinylidene fluoride and hexafluoropropylene, Mooney viscosity of 33 (as determined by ASTM D1646-81, ML 1+10 at 121° C.), containing 10 weight percent inorganic partitioning agent. FX-9613 is a free-flowing powder.

Compositions containing FX-96113 were prepared on a production scale, continuous Banbury mixing system. The initial blending of FX-9613 and the polyethylene resin was done on a ribbon blender which was fed continuously to a Mixtrument mixer. Following extrusion the material was pelletized. Fluorine analyses performed according to the procedure described in the 3M Company brochure "Parr Bomb Analytical Method for Determining Total Organic Fluorine Concentration in Polyethylene", brochure number 98-0211-2542-6, issued 12/86) of the resin confirmed the presence of the desired level of FX-9613. The polyethylene resin used in compositions which did not contain FX-9613 similarly mixed to eliminate the effect of shear history in comparison with the FX-9613 containing blends.

Further compounding of both FX-9613 containing compositions and non-FX-9613 containing compositions with P-1, P-2, P-3 and P-4 organophosphites and PA-1 organophosphate was done on an HBI System 40 Torque Rheometer using a Rheomix 3000 mixer. A residence time of three minutes at 50 rpm was sufficient in each case to obtain a constant torque with a final melt temperature of 200°–210° C. The fully compounded resins were ground to faciltate feeding to the capillary rheometer.

Rheological studies were done on an Instron Model 4202 System with a 3210 Capillary Rheometer usin a 0.508 mm die with length/diameter ratio of 40 and a 60 degree entrance angle. In these examples, two different 0.508 mm die (nominal diameter) were used. A dwell time of 10 minutes and a temperature of 210° C. were used. Equilibrium viscosities measured at a 600 $sec^1$ shear rates were determined. The viscosities are uncorrected. The extrudate was sampled and photomicrographs of air-cooled capillary extrudates were made. The photomicrographs were visually studied to determine the onset of melt defects.

The extrudable compositions used in the examples and the results of the rheological studies are summarized in Table 1.

TABLE 1

| Ex. | Additives | | | Shear rate for onset of melt fracture, (s$^{-1}$) | Apparent LLDPE resin viscosity at 600 s$^{-1}$ shear rate, Poise |
|---|---|---|---|---|---|
| | FX-9613 (%) | Organophosphite or Organophosphate | | | |
| | | code | level, (%) | | |
| C1 | 0 | — | 0 | <600 | 6130 |
| C2 | 0.050 | — | 0 | 1400 | 3720 |
| C3 | 0 | P-1 | 0.20 | <600 | 6150 |
| C4 | 0 | P-2 | 0.20 | <600 | 6000 |
| C5 | 0 | P-3 | 0.20 | <600 | 5860 |
| 1 | 0.050 | P-1 | 0.20 | 1900 | 3380 |
| 2 | 0.050 | P-2 | 0.20 | 1800 | 3450 |
| 3 | 0.050 | P-3 | 0.20 | 1800 | 3560 |
| C6* | 0 | — | 0 | <600 | 5190 |
| C7* | 0.050 | — | 0 | 1900 | 3600 |
| C8* | 0 | P-4 | 0.20 | <600 | 4910 |
| C9* | 0 | PA-1 | 0.20 | <600 | 4910 |
| 4* | 0.050 | P-4 | 0.20 | >2000 | 2990 |
| 5* | 0.050 | PA-1 | 0.20 | >2000 | 3170 |

*Samples were extruded using the second die.

The data show that melt fracture in extruded polyethylene filaments occurs at higher shear rates in the presence of both fluorocarbon polymer and organophosphite or organophosphate. Also, the equilibrium resin viscosity is significantly lower when both additives, i.e. fluorocarbon polymer and organophosphite or organophosphate are present. The phosphite or phosphate esters alone have little effect on shear rate or viscosity.

Various modifications and alterations of this invention will become apparent to those skilled in the art without departing from the scope and spirit of this invention.

What is claimed is:

1. An extrudable composition comprising
(A) thermoplastic olefin polymer, as the major or predominant component of the composition,
(B) organophosphite, organophosphate, or blends thereof, and
(C) fluorocarbon polymer where the weight ratio of said fluorocarbon polymer to said organophosphite, organophosphate, or blend thereof is in the range of 1/1 to 1/5, the concentration of said fluorocarbon polymer is 0.005 to 0.1 weight percent, and the concentration of said organophosphite, organophosphate, or blend thereof is 0.01 to 0.2 weight percent based on the total composition weight.

2. The composition of claim 1 where said thermoplastic olefin polymer is selected from the group consisting of homopolymers of olefin, copolymers of olefins, and copolymers of one or more olefins and up to 30 weight percent of one or more monomers wich are copolymerized with such olefins, and blends thereof.

3. The composition of claim 2 where said thermoplastic olefin polymer is seleced from the group consisting of homopolymers or ethylene, homopolymers of propylene, copolymers of ethylene and 1-butene, copolymers of ethylene and 1-hexene, copolymers of ethylene and 1-octene, copolymers of ethylene and 4-methyl-1-pentene, copolymers of ethylene and propylene, copolymers of ethylene and ethyl vinyl acetate, copolymers of ethylene and ethyl methacrylate, and blends thereof.

4. The composition of claim 1 where said organophosphite or organophosphate have the general formula

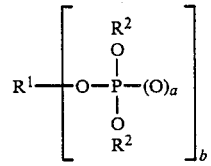

where a is 1 or 0, (where a is 0 the compound depicted is organophosphite and where a is 1 the compound depicted is organophosphate) b is an integer of 1 to 4 and equal to the valence of $R^1$, $R^1$ is a monovalent or polyvalent organic radical, the $R^2$ groups, which can be the same or different, are monovalent organic radicals having from 1 to 30 carbon atoms and can be selected from substituted and unsubstituted aryl, alkyl, or combinations thereof and cycloalkyl groups, and $R^1$ and $R^2$ groups can contain heteroatoms and can be substituted with non-interferring substituents.

5. The composition of claim 4 where said organophosphite or organophosphate is selected from the group consisting of
tris(2,4-di-tert.-butylphenyl) phosphite,
bis(2,4-di-tert.-butylphenyl) pentaerythritol diphosphite,
tris(4-nonylphenyl ) phosphite,
tris[4-(1-phenylethyl)phenyl]phosphite,
tetrakis(2,4-di-tert.-butylphenyl)-4,4'-bisphenylene diphosphite, tris(4-methylphenyl) phosphite,
tris(4-chlorophenyl) phosphite,
decyl diphenyl phosphite,
tris(2,4-di-tert.-butylphenyl) phosphate,
tris(4-methylphenyl) phosphate,
tris(4-nonylphenyl) phosphate,
tris(4-chlorophenyl) phosphate,
2-ethylhexyl diphenyl phosphate, and blends thereof.

6. The composition of claim 1 where said fluorocarbon polymer is selected from the group consisting of copolymers derived from fluorinated monomers and one or more additional fluorinated or non-fluorinated monomers.

7. The composition of claim 6 where said fluorocarbon polymer is a copolymer of vinylidene fluoride and hexafluoropropylene.

8. The composition of claim 6 where said fluorocarbon polymer is a copolymer of vinylidene fluoride, hexafluoropropylene and tetrafluoroethylene.

9. The composition of claim 1 where said thermoplastic olefin polymer is a copolymer of ethylene and butene-1, said organophosphite is selected from the group consisting of tris(2,3-di-tert.-butylphenyl) phosphite, bis(2,4-di-tert.-butylphenyl) pentaerythritol diphosphite, and tris(4-nonylphenyl) phosphite, and said fluorocarbon polymer is a copolymer of vinylidene fluoride and hexafluoropropylene.

10. The composition of claim 1 where said organophosphate is tris(4-methylphenyl) phosphate.

* * * * *

UNITED STATES PATENT AND TRADEMARK OFFICE
CERTIFICATE OF CORRECTION

PATENT NO. : 4,863,983

DATED : September 5, 1989

INVENTOR(S) : BRYCE V. JOHNSON ET AL

It is certified that error appears in the above-identified patent and that said Letters Patent is hereby corrected as shown below:

Col. 1, Line 11, "of" should be --or--.

Col. 1, Line 29, "Plastic" should be --Plastics--.

Col. 1, Line 33, "polyethylne" should be --polyethylene--.

Col. 1, Line 64, "(Hor" should be --(Horn--.

Col. 2, Line 17, "ae" should be --are--.

Col. 2, Line 63, "olfins" shuld be --olefins--.

Col. 3, Line 61, "ar" should be --are--.

Col. 4, Line 53, "orgaophoshites and organophosphtes to --organophosphites and organophosphates--.

Col. 4, Line 54, "comounds" should be --compounds--.

Col. 5, Line 51, "1,5" should be --1/5--.

Col. 5, Line 52, "$\frac{1}{2}$ to $\frac{1}{4}$" should be --1/2 to 1/4--.

Col. 6, Line 15, "contining" should be --containing--.

Col. 6, Line 25, "TM" should be a superscript.

Col. 6, Line 31, "FX-96113" should be --FX-9613--.

Col. 6, Line 58, "usin" should be --using--.

Col. 6, Line 64, "rates" should be --rate--.

Col. 7, Line 56, "wich" should be --which--.

UNITED STATES PATENT AND TRADEMARK OFFICE
CERTIFICATE OF CORRECTION

PATENT NO. : 4,863,983

DATED : September 5, 1989

INVENTOR(S) : BRYCE V. JOHNSON ET AL

It is certified that error appears in the above-identified patent and that said Letters Patent is hereby corrected as shown below:

Col. 8, Line 7-13,

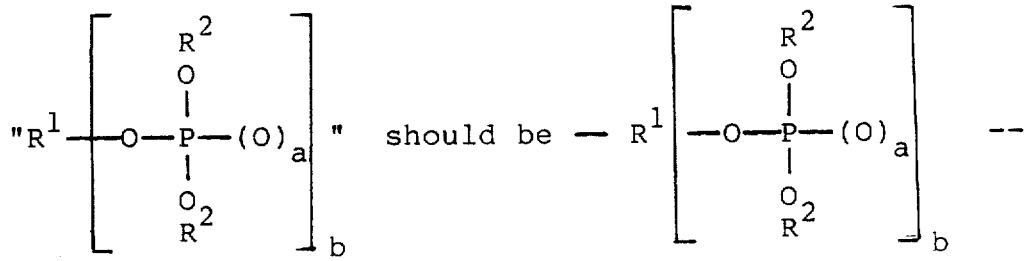

Signed and Sealed this

Twenty-fourth Day of December, 1991

*Attest:*

HARRY F. MANBECK, JR.

*Attesting Officer*   *Commissioner of Patents and Trademarks*